(12) United States Patent
Takahashi et al.

(10) Patent No.: US 9,834,737 B2
(45) Date of Patent: Dec. 5, 2017

(54) REFRIGERATOR OIL COMPOSITION AND REFRIGERATOR

(71) Applicant: JX NIPPON OIL & ENERGY CORPORATION, Tokyo (JP)

(72) Inventors: Hitoshi Takahashi, Tokyo (JP); Ken Sawada, Tokyo (JP); Akira Tada, Tokyo (JP); Souichirou Konno, Tokyo (JP)

(73) Assignee: JX NIPPON OIL & ENERGY CORPORATION, Tokyo (JP)

( * ) Notice: Subject to any disclaimer, the term of this patent is extended or adjusted under 35 U.S.C. 154(b) by 0 days.

(21) Appl. No.: 15/026,346

(22) PCT Filed: Sep. 30, 2014

(86) PCT No.: PCT/JP2014/076074
§ 371 (c)(1),
(2) Date: Mar. 31, 2016

(87) PCT Pub. No.: WO2015/050120
PCT Pub. Date: Apr. 9, 2015

(65) Prior Publication Data
US 2016/0244692 A1 Aug. 25, 2016

(30) Foreign Application Priority Data
Oct. 2, 2013 (JP) ................................. 2013-207308

(51) Int. Cl.
*C10M 171/00* (2006.01)
*C10M 169/04* (2006.01)
(Continued)

(52) U.S. Cl.
CPC ......... *C10M 171/008* (2013.01); *C09K 5/045* (2013.01); *C10M 105/32* (2013.01);
(Continued)

(58) Field of Classification Search
CPC ............. C09K 5/045; C09K 2205/126; C10M 105/32; C10M 129/118; C10M 133/16; C10M 2207/042
See application file for complete search history.

(56) References Cited

U.S. PATENT DOCUMENTS 5,860,656 A * 1/1999 Obata .................. F16J 15/3232
277/549
2010/0175421 A1* 7/2010 Kaneko .................. C09K 5/045
62/468

(Continued)

FOREIGN PATENT DOCUMENTS

JP  H10-147682 A   6/1998
JP  2009-222034 A  10/2009

(Continued)

OTHER PUBLICATIONS

European Search report issued with respect to application No. 14850864.1, dated Jul. 22, 2016.
International Preliminary Report on Patentability issued with respect to application No. PCT/JP2014/076074, dated Apr. 14, 2016.

(Continued)

*Primary Examiner* — John Hardee
(74) *Attorney, Agent, or Firm* — Greenblum & Bernstein, P.L.C.

(57) ABSTRACT

The present invention provides a refrigerating machine oil composition comprising an ester-based base oil, an epoxy compound, and a carbodiimide compound, the refrigerating machine oil composition being used with a refrigerant containing a fluoropropene in a refrigerating machine comprising a member containing polyethylene terephthalate and/or a member containing hydrogenated acrylonitrile butadiene rubber.

20 Claims, 1 Drawing Sheet

(51) Int. Cl.
  *C10M 105/32* (2006.01)
  *C10M 129/18* (2006.01)
  *C09K 5/04* (2006.01)
  *C10M 133/16* (2006.01)
  *F25B 31/00* (2006.01)
  *F25B 43/00* (2006.01)
  *C10N 40/30* (2006.01)

(52) U.S. Cl.
  CPC ........ *C10M 129/18* (2013.01); *C10M 133/16* (2013.01); *C10M 169/04* (2013.01); *F25B 31/002* (2013.01); *F25B 43/003* (2013.01); C09K 2205/126 (2013.01); C10M 2207/042 (2013.01); C10M 2207/2805 (2013.01); C10M 2207/2835 (2013.01); C10M 2207/3045 (2013.01); C10M 2215/086 (2013.01); C10M 2215/14 (2013.01); C10N 2040/30 (2013.01); C10N 2220/302 (2013.01); C10N 2230/10 (2013.01); C10N 2230/36 (2013.01); C10N 2240/30 (2013.01); F25B 2500/06 (2013.01)

(56) References Cited

U.S. PATENT DOCUMENTS

| | | | |
|---|---|---|---|
| 2011/0011124 A1* | 1/2011 | Matsuura | C09K 5/045 62/468 |
| 2012/0024007 A1 | 2/2012 | Ota et al. | |
| 2015/0014575 A1* | 1/2015 | Saito | C09K 5/042 252/68 |

FOREIGN PATENT DOCUMENTS

| | | |
|---|---|---|
| JP | 2012-007179 A | 1/2012 |
| JP | 2012-131994 A | 7/2012 |
| JP | 2013-173940 A | 9/2013 |
| WO | 2010-029704 A1 | 3/2010 |
| WO | 2013/129566 A1 | 9/2013 |

OTHER PUBLICATIONS

International Search Report issued with respect to application No. PCT/JP2014/076074, dated Dec. 16, 2014.

* cited by examiner

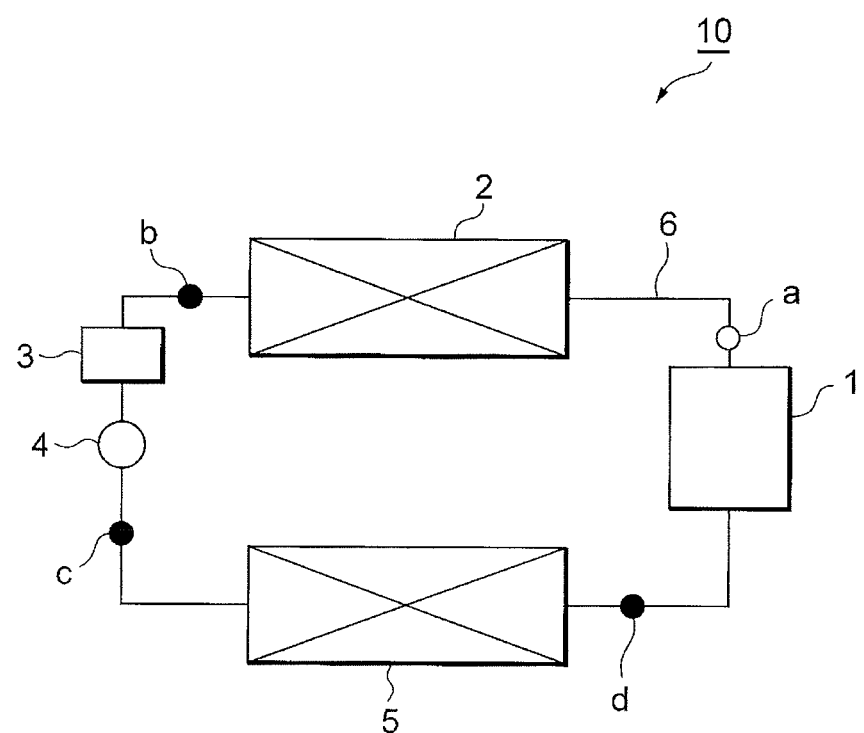

REFRIGERATOR OIL COMPOSITION AND REFRIGERATOR

TECHNICAL FIELD

The present invention relates to a refrigerating machine oil composition, a working fluid composition for a refrigerating machine, use of a composition comprising an ester-based base oil, an epoxy compound, and a carbodiimide compound for a refrigerating machine oil or a working fluid composition for a refrigerating machine, use of a composition for manufacturing a refrigerating machine oil composition or a working fluid composition for a refrigerating machine, and a refrigerating machine.

BACKGROUND ART

In a refrigerating machine such as cold storages and air conditioners, a refrigerating machine oil is used with a refrigerant, in order to prevent friction, wear, and seizure in a compression sliding portion. Examples of the properties required for such refrigerating machine oils include compatibility with a refrigerant and compatibility with members inside the refrigerating machine.

That is, in addition to lubricity, thermal/chemical stability, and refrigerant compatibility in the presence of a refrigerant, the refrigerating machine oil is required not to degrade the members when coming in contact with the members of a refrigerating machine, and so on. Thus, depending on the material of the members in the refrigerating machine, it is suggested to use a refrigerating machine oil which is compatible with them. For example, in the following Patent Literature 1, a refrigerating machine oil for suppressing degradation of polyamide resin such as nylon is disclosed.

CITATION LIST

Patent Literature

Patent Literature 1: Japanese Unexamined Patent Publication No. 2012-131994

SUMMARY OF INVENTION

Technical Problem

However, a refrigerating machine comprises members of various types which differ in the physical or chemical characteristics, and it is difficult to achieve compatibility with the members with one refrigerating machine oil.

In particular, it is extremely difficult to simultaneously achieve compatibility with members containing polyethylene terephthalate and compatibility with members containing hydrogenated acrylonitrile butadiene rubber. In the case where a conventional refrigerating machine oil is used, it is not possible to sufficiently suppress degradation of both the members. Also, the degree of such degradation depends on types of refrigerants, and degradation of the above described members tends to be significant under use of a fluoropropene refrigerant.

The present invention has been made in consideration of the situation described above, and it is an object of the present invention to provide a refrigerating machine oil composition and a working fluid composition for a refrigerating machine which are compatible with any of members containing polyethylene terephthalate and members containing hydrogenated acrylonitrile butadiene rubber under use of a fluoropropene refrigerant.

Solution to Problem

The present invention provides a refrigerating machine oil composition comprising an ester-based base oil, an epoxy compound, and a carbodiimide compound, wherein the refrigerating machine oil composition is used with a refrigerant containing a fluoropropene in a refrigerating machine comprising a member containing polyethylene terephthalate and/or a member containing hydrogenated acrylonitrile butadiene rubber.

It is preferred that the ester-based base oil comprise an ester of pentaerythritol and a monocarboxylic fatty acid and/or an ester of dipentaerythritol and a monocarboxylic fatty acid.

It is more preferred that the ester-based base oil comprise an ester of pentaerythritol and a mixture of two or more monocarboxylic fatty acids and/or an ester of dipentaerythritol and a mixture of two or more monocarboxylic fatty acids.

Also, the present invention provides a working fluid composition for a refrigerating machine comprising the above described refrigerating machine oil composition and a refrigerant containing a fluoropropene, wherein the working fluid composition for a refrigerating machine is used in a refrigerating machine comprising a member containing polyethylene terephthalate and/or a member containing hydrogenated acrylonitrile butadiene rubber.

It may also be said that the present invention is use of a composition for a refrigerating machine oil composition or a working fluid composition for a refrigerating machine, the composition comprising an ester-based base oil, an epoxy compound, and a carbodiimide compound, wherein the refrigerating machine oil composition is used with a refrigerant containing a fluoropropene in a refrigerating machine comprising a member containing polyethylene terephthalate and/or a member containing hydrogenated acrylonitrile butadiene rubber, and wherein the working fluid composition for a refrigerating machine comprises a refrigerating machine oil composition and a refrigerant containing a fluoropropene and is used in a refrigerating machine comprising a member containing polyethylene terephthalate and/or a member containing hydrogenated acrylonitrile butadiene rubber.

It may also be said that the present invention is application of a composition for manufacturing a refrigerating machine oil composition or a working fluid composition for a refrigerating machine, the composition comprising an ester-based base oil, an epoxy compound, and a carbodiimide compound, wherein the refrigerating machine oil composition is used with a refrigerant containing a fluoropropene in a refrigerating machine comprising a member containing polyethylene terephthalate and/or a member containing hydrogenated acrylonitrile butadiene rubber, and wherein the working fluid composition for a refrigerating machine comprises a refrigerating machine oil composition and a refrigerant containing a fluoropropene and is used in a refrigerating machine comprising a member containing polyethylene terephthalate and/or a member containing hydrogenated acrylonitrile butadiene rubber.

Also, the present invention provides a refrigerating machine comprising a refrigerant circulation system containing a compressor, a condenser, an expansion mechanism, and an evaporator, wherein the refrigerant circulation system comprises a member containing polyethylene terephthalate and/or a member containing hydrogenated acrylonitrile butadiene rubber, and wherein the refrigerant circulation system is filled with a refrigerating machine oil composition comprising an ester-based base oil, an epoxy compound, and a carbodiimide compound and a refrigerant containing a fluoropropene.

Advantageous Effects of Invention

According to the present invention, it is possible to provide a refrigerating machine oil composition and a working fluid composition for a refrigerating machine which are compatible with any of members containing polyethylene terephthalate and members containing hydrogenated acrylonitrile butadiene rubber under use of a fluoropropene refrigerant.

BRIEF DESCRIPTION OF DRAWINGS

FIG. 1 is a schematic view showing an example of the configuration of a refrigerating machine.

DESCRIPTION OF EMBODIMENTS

Hereinafter, preferred embodiments of the present invention will be described in detail.

A refrigerating machine oil composition according to the present embodiment comprises an ester-based base oil, an epoxy compound, and a carbodiimide compound, and is used with a refrigerant containing a fluoropropene in a refrigerating machine comprising a member containing polyethylene terephthalate and/or a member containing hydrogenated acrylonitrile butadiene rubber.

Also, a working fluid composition for a refrigerating machine according to the present embodiment comprises a refrigerating machine oil composition comprising an ester-based base oil, an epoxy compound, and a carbodiimide compound, and a refrigerant containing a fluoropropene, and is used in a refrigerating machine comprising a member containing polyethylene terephthalate and/or a member containing hydrogenated acrylonitrile butadiene rubber. It should be noted that the working fluid composition for a refrigerating machine according to the present embodiment includes an aspect comprising the refrigerating machine oil composition according to the present embodiment and a refrigerant containing a fluoropropene.

As the ester-based base oil contained in the refrigerating machine oil according to the present embodiment, polyol esters obtained by the esterification reaction of a polyhydric alcohol (polyol) and a monocarboxylic acid (monocarboxylic fatty acid), complex esters of a polyhydric alcohol, a monocarboxylic acid, and a polycarboxylic acid, complex esters of a polyhydric alcohol, a monohydric alcohol, and a polycarboxylic acid, or their mixtures are preferred.

As the above described polyhydric alcohol, neopentyl polyols, such as neopentyl glycol, trimethylolpropane, pentaerythritol, and dipentaerythritol are preferred. As the above described monocarboxylic acid, monocarboxylic acids in which the number of carbon atoms is from 4 to 10 are preferred, and specific examples include n-butanoic acid, n-pentanoic acid, n-hexanoic acid, n-heptanoic acid, n-octanoic acid, n-nonanic acid, n-decanoic acid, i-butanoic acid, i-pentanoic acid, i-hexanoic acid, i-heptanoic acid, 2-ethylpentanoic acid, 2-methylhexanoic acid, i-octanoic acid, 2-ethylhexanoic acid, i-nonanic acid, 3,5,5-trimethylhexanoic acid, and i-decanoic acid. As the above described polycarboxylic acid, dicarboxylic acids, such as malonic acid, succinic acid, glutaric acid, adipic acid, pimelic acid, suberic acid, and azelaic acid are preferred. As an alcohol and a carboxylic acid constituting the above described ester, one alcohol and one carboxylic acid may be used, and one or both of the alcohol and the carboxylic acids may be used in combinations of two or more.

As the ester-based base oil, specifically, the following esters and the following mixtures of esters are preferably used, for example:

esters of pentaerythritol and a mixed acid of 2-methylpropanoic acid/3,5,5-trimethylhexanoic acid (at a molar ratio of 1/9 to 9/1);

esters of neopentyl glycol and a mixed acid of 2-ethylhexanoic acid/3,5,5-trimethylhexanoic acid (at a molar ratio of 1/9 to 9/1);

esters of dipentaerythritol and a mixed acid of 2-ethylhexanoic acid/3,5,5-trimethylhexanoic acid (at a molar ratio of 1/9 to 9/1);

esters obtained by allowing an ester intermediate from reaction of trimethylolpropane with adipic acid to further react with 2-ethylhexanol and distilling the remaining unreacted material off (at a molar ratio of 5 to 40 mol % of trimethylolpropane, 20 to 60 mol % of adipic acid, and 20 to 60 mol % of 2-ethylhexanol); and esters of pentaerythritol and a mixed acid of n-pentanoic acid/n-heptanoic acid/3,5,5-trimethylhexanoic acid (at the molar ratio of 20 to 60 mol % of n-pentanoic acid, n-heptanoic acid and 5 to 40 mol % of 3,5,5-trimethylhexanoic acid).

The refrigerating machine oil composition according to the present embodiment may comprise a base oil other than ester-based base oils. As the base oil, known mineral oils or synthetic oils may be used, and it is preferred to use an ether-based base oil.

As the ether-based base oil, various types can be used, and typical examples include polyether compounds represented by the following formula (1):

[Chemical Formula 1]

$$X\text{-}[\text{O-}(AO)_n\text{-}R^1]_m \qquad (1)$$

[In the formula (1), X represents a hydrocarbon group in the form of a monool or polyol from which a hydroxyl group is removed, A represents an alkylene group in which the number of carbon atoms is from 2 to 4, $R^1$ represents a hydrogen atom or an alkyl group in which the number of carbon atoms is from 1 to 10, m represents the valence of X, and n represents an integer of 2 or more].

In the formula (1), $(AO)_n$ represents one formed by connecting a total of n groups selected from one or two or more of an oxyethylene group, an oxypropylene group, and an oxybutylene group, and it is possible to arrange each oxyalkylene group in $(AO)_n$ in a desired order.

In the present embodiment, the content of the base oil is preferably 20% by mass or more, and more preferably 40% by mass or more, based on the total amount of the refrigerating machine oil composition. The content of the ester-based base oil is preferably 20% by mass or more, and preferably 40% by mass or more, based on the total amount of the refrigerating machine oil composition.

The refrigerating machine oil composition according to the present embodiment comprises an epoxy compound and a carbodiimide compound in addition to the above described base oil.

Examples of the epoxy compound include, but not particularly limited to, glycidyl ether-type epoxy compounds, glycidyl ester-type epoxy compounds, oxirane compounds, alkyl oxirane compounds, alicyclic epoxy compounds, epoxidized fatty acid monoesters, and epoxidized vegetable oils.

As the glycidyl ether-type epoxy compound, it is possible to use, for example, an aryl glycidyl ether-type epoxy compound or alkyl glycidyl ether-type epoxy compound represented by the following formula (2).

[Chemical Formula 2]

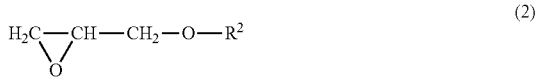

(2)

[In the formula (2), $R^2$ represents an aryl group or an alkyl group in which the number of carbon atoms is from 5 to 18].

As the glycidyl ether-type epoxy compound represented by the formula (2), n-butylphenyl glycidyl ether, i-butylphenyl glycidyl ether, sec-butylphenyl glycidyl ether, tert-butylphenyl glycidyl ether, pentylphenyl glycidyl ether, hexylphenyl glycidyl ether, heptylphenyl glycidyl ether, octylphenyl glycidyl ether, nonylphenyl glycidyl ether, decylphenyl glycidyl ether, decylglycidyl ether, undecylglycidyl ether, dodecyl glycidyl ether, tridecyl glycidyl ether, tetradecyl glycidyl ether, and 2-ethylhexyl glycidyl ether are preferred.

If the number of carbon atoms of the alkyl group represented by $R^2$ is 5 or more, the stability of the epoxy compound is ensured, and it is possible to suppress decomposition before reaction with moisture, fatty acid, and oxidization deteriorated material or self-polymerization between epoxy compounds, and the intended function becomes easy to achieve. Meanwhile, if the number of carbon atoms of the alkyl group represented by $R^2$ is 18 or less, the solubility in a refrigerant, in particular, a hydrofluorocarbon refrigerant is well maintained, and it is possible to make malfunctions such as cooling defects due to deposition in refrigerating apparatuses less likely to occur.

Also, as the glycidyl ether-type epoxy compound, other than epoxy compounds represented by the formula (2), it is possible to use neopentyl glycol diglycidyl ether, trimethylolpropane triglycidyl ether, pentaerythritol tetraglycidyl ether, 1,6-hexanediol diglycidyl ether, sorbitol polyglycidyl ether, polyalkylene glycol monoglycidyl ethers, polyalkylene glycol diglycidyl ethers and the like.

As the glycidyl ester-type epoxy compound, it is possible to use, for example, those represented by the following formula (3).

[Chemical Formula 3]

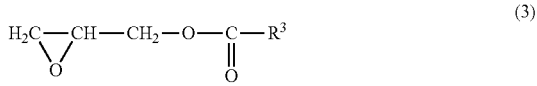

(3)

[In the formula (3), $R^3$ represents an aryl group, an alkyl group in which the number of carbon atoms is from 5 to 18, or an alkenyl group].

As the glycidyl ester-type epoxy compound represented by the formula (3), glycidyl benzoate, glycidyl neodecanoate, glycidyl -2,2-dimethyloctanoate, glycidyl acrylate, and glycidyl methacrylate are preferred.

If the number of carbon atoms of the alkyl group represented by $R^3$ is 5 or more, the stability of the epoxy compound is ensured, and it is possible to suppress decomposition before reaction with moisture, fatty acid, and oxidization deteriorated material or self-polymerization between epoxy compounds, and the intended function becomes easy to achieve. Meanwhile, if the number of carbon atoms of the alkyl group or alkenyl group represented by $R^3$ is 18 or less, the solubility in a refrigerant, in particular, a hydrofluorocarbon refrigerant is well maintained, and it is possible to make malfunctions such as cooling defects due to deposition in refrigerating apparatuses less likely to occur.

An alicyclic epoxy compound is a compound having a partial structure represented by the following formula (4) in which carbon atoms constituting the epoxy group directly constitute the alicyclic ring.

[Chemical Formula 4]

(4)

As the alicyclic epoxy compound, 1,2-epoxycyclohexane, 1,2-epoxycyclopentane, 3',4'-epoxycyclohexylmethyl-3,4-epoxycyclohexanecarboxylate, bis(3,4-epoxycyclohexylmethyl)adipate, exo-2,3-epoxynorbornane, bis(3,4-epoxy-6-methylcyclohexylmethyl)adipate, 2-(7-oxabicyclo[4.1.0]hept-3-yl)-spiro(1,3-dioxane-5,3'-[7]oxabicyclo[4 0.1.0]heptane, 4-(1'-methylepoxyethyl)-1,2-epoxy-2-methylcyclohexane, and 4-epoxyethyl-1,2-epoxycyclohexane are preferred.

Examples of the allyloxirane compound include 1,2-epoxystyrene and alkyl-1,2-epoxystyrenes.

Examples of the alkyl oxirane compound include 1,2-epoxybutane, 1,2-epoxypentane, 1,2-epoxyhexane, 1,2-epoxyheptane, 1,2-epoxyoctane, 1,2-epoxynonane, 1,2-epoxydecane, 1,2-epoxyundecane, 1,2-epoxydodecane, 1,2-epoxytridecane, 1,2-epoxytetradecane, 1,2-epoxypentadecane, 1,2-epoxyhexadecane, 1,2-epoxyheptadecane, 1,2-epoxyoctadecane, 1,2-epoxynonadecane, and 1,2-epoxyicosane.

Examples of the epoxidized fatty acid monoester include esters of an epoxidized fatty acid in which the number of carbon atoms is from 12 to 20 and an alcohol in which the number of carbon atoms is from 1 to 8 or a phenol or alkyl phenol. As the epoxidized fatty acid monoester, butyl, hexyl, benzyl, cyclohexyl, methoxyethyl, octyl, phenyl, and butylphenyl esters of epoxystearic acids are preferably used.

Examples of the epoxidized vegetable oil include epoxy compounds of vegetable oils, such as soy oil, linseed oil, and cottonseed oil.

The content of the epoxy compound is preferably 0.1% by mass or more and 4.5% by mass or less, more preferably 0.5% by mass or more and 3.5% by mass or less, further preferably 1.0% by mass or more and 2.5% by mass or less, based on the total amount of the refrigerating machine oil composition. If the content is the above described lower limit or more, it is possible to suppress an increase in the acid value of the refrigerating machine oil composition. If the content is the above described upper limit or less, even in the case where the refrigerating machine oil composition is used with a fluoropropene refrigerant, it is possible to suppress a deterioration in a member containing polyethylene terephthalate and a member containing hydrogenated acrylonitrile butadiene rubber.

As the carbodiimide compound, which is not particularly limited, for example, it is possible to use dialkylcarbodiimide, diphenylcarbodiimide, and bis(alkylphenyl)carbodiimide.

Example of the dialkylcarbodiimide include diisopropylcarbodiimide and dicyclohexylcarbodiimide.

Examples of the bis(alkylphenyl)carbodiimide include ditolylcarbodiimide, bis(isopropylphenyl)carbodiimide, bis(diisopropylphenyl)carbodiimide, bis(triisopropylphenyl)carbodiimide, bis(butylphenyl)carbodiimide, bis(dibutylphenyl)carbodiimide, and bis(nonylphenyl)carbodiimide.

The content of the carbodiimide compound is preferably 0.01% by mass or more and 1% by mass or less, more preferably 0.05% by mass or more and 0.5% by mass or less, based on the total amount of the refrigerating machine oil composition. If the content is the above described lower limit or more, the stability of the refrigerating machine oil composition is more increased. If the content is the above described upper limit or less, it is possible to suppress occurrence of sludge derived from additives during a long time of use.

The kinematic viscosity of the refrigerating machine oil composition at 40° C. can be preferably from 3 to 1000 mm$^2$/s, more preferably from 4 to 500 mm$^2$/s, and further preferably from 5 to 400 mm$^2$/s. The kinematic viscosity of the refrigerating machine oil composition at 100° C. can be preferably from 1 to 100 mm$^2$/s and more preferably from 2 to 50 mm$^2$/s. The kinematic viscosity in the present invention means the kinematic viscosity measured in compliance with JIS K2283:2000.

The pour point of the refrigerating machine oil composition can be preferably −10° C. or less and more preferably −20° C. or less. The pour point in the present invention means the pour point measured in compliance with JIS K2269-1987.

The volume resistivity of the refrigerating machine oil composition can be preferably $1.0 \times 10^9$ Ω·m or more, more preferably $1.0 \times 10^{10}$ Ω·m or more, and further preferably $1.0 \times 10^{11}$ Ω·m or more. In particular, in the case of being used for a hermetic-type refrigerating machine, it is preferred that the composition be highly insulating. The volume resistivity in the present invention means the volume resistivity at 25° C. measured in compliance with JIS C2101: 1999.

The moisture content of the refrigerating machine oil composition can be preferably 200 ppm or less, more preferably 100 ppm or less, and further preferably 50 ppm or less, based on the total amount of the refrigerating machine oil composition. Particularly, in the case of being used for a hermetic-type refrigerating machine, it is preferred that the moisture content be low, from the viewpoint of the influence on the thermal/chemical stability and the electrical insulation property of the refrigerating machine oil composition.

The acid value of the refrigerating machine oil composition can be preferably 10.0 mgKOH/g or less, more preferably 1.0 mgKOH/g or less, and further preferably 0.1 mgKOH/g or less. The hydroxy value of refrigerating machine oil composition can be preferably 50.0 mgKOH/g or less, more preferably 30.0 mgKOH/g or less, and further preferably 10.0 mgKOH/g or less. It is preferred that the acid value and the hydroxy value of the refrigerating machine oil be in the above described range, from the viewpoints of prevention of corrosion of the metal used in a refrigerating machine or piping and of prevention of degradation of the ester contained in the refrigerating machine oil composition. The acid value in the present invention means the acid value measured in compliance with JIS K2501:2003. The hydroxy value in the present invention means the hydroxy value measured in compliance with JIS K0070-1992.

The ash content of the refrigerating machine oil composition can be preferably 100 ppm or less and more preferably 50 ppm or less, from the viewpoint of increasing the thermal/chemical stability of the refrigerating machine oil composition and suppressing the occurrence of sludge and the like. The ash content in the present invention means the ash content measured in compliance with JIS K2272: 1998.

In the present embodiment, in order to impart total performance, it is possible to add the following additives or other known additives to the refrigerating machine oil composition as appropriate, within the extent that the properties of the refrigerating machine oil composition are not impaired.

Antiwear agent: sulfur-based, phosphorous-based, zinc thiophosphate-based, and the like;

Antioxidant: phenol-based, amine-based, phosphorous-based, and the like;

Metal deactivator: benzotriazole (derivatives), thiadiazoles, dithiocarbamates, and the like;

Oiliness agent: higher fatty acids, alcohols, amines, and the like; and

Antifoaming agent: silicone oils and the like.

The refrigerating machine oil composition according to the present embodiment is used with a refrigerant containing a fluoropropene, and also, the working fluid composition for a refrigerating machine according to the present embodiment comprises a refrigerant containing a fluoropropene.

As the fluoropropene refrigerant, fluoropropenes of which the number of fluorine atoms is 3 to 5 are preferred, and it is preferred that the fluoropropene refrigerant be any one of 1,2,3,3,3-pentafluoropropene (HFO-1225ye), 1,3,3,3-tetrafluoropropene (HFO-1234ze), 2,3,3,3-tetrafluoropropene (HFO-1234yf), 1,2,3,3-tetrafluoropropene (HFO-1234ye), and 3,3,3-trifluoropropene (HFO-1243zf) or a mixture of two or more of these. From the viewpoint of refrigerant physical properties, it is preferred that the refrigerant be one or two or more selected from HFO-1225ye, HFO-1234ze, and HFO-1234yf.

The refrigerant used with the refrigerating machine oil composition according to the present embodiment may include refrigerants other than fluoropropene. Examples of the refrigerant other than fluoropropene include saturated hydrofluorocarbon refrigerant, fluorine-containing ether-based refrigerants such as perfluoroether, bis(trifluoromethyl)sulfide refrigerants, trifluoroiodomethane refrigerants, and natural refrigerant, such as dimethyl ether, carbon dioxide, ammonia, and hydrocarbons.

The refrigerating machine oil composition and the working fluid composition for a refrigerating machine according to the present embodiment are preferably used for a refrigerating machine comprising a member containing polyethylene terephthalate and/or a member containing hydrogenated acrylonitrile butadiene rubber. Specific examples of the refrigerating machine include a refrigerating machine, such as automobile air conditioners comprising a reciprocating or rotary compressor, air conditioners, dehumidifiers, cold storages, freezers, freezing cold storages, vending machines, showcases, and cooling apparatus for chemical plants.

Hereinafter, the aforementioned refrigerating machine will be described in more detail. FIG. 1 is a schematic view showing an example of the configuration of a refrigerating machine. As shown in FIG. 1, a refrigerating machine 10 comprises a refrigerant circulation system in which at least a compressor 1, a condenser 2, an expansion mechanism 4, and an evaporator 5 are successively connected by a passage 6. The refrigerant circulation system may further comprise a desiccator 3. Also, the refrigerant circulation system a member containing polyethylene terephthalate and/or a member containing hydrogenated acrylonitrile butadiene rubber.

In the compressor 1, a small amount of the refrigerant and a large amount of the refrigerating machine oil composition coexist under a high temperature (usually 70 to 120° C.) condition. The refrigerant released from the refrigerant compressor 1 to the passage 6 is gaseous and contains a small amount of (usually 1 to 10% of) the refrigerating machine oil composition as mist, and in this mist refrigerating machine oil composition, a small amount of the refrigerant is dissolved (point a in FIG. 1). Next, in the condenser 2, the gaseous refrigerant is compressed to be high-density fluid, and under a relatively high temperature (usually 50 to around 70° C.) condition, a large amount of the refrigerant and a small amount of the refrigerating machine oil coexist (point b in FIG. 1). Furthermore, the mixture of a large amount of the refrigerant and a small amount of the refrigerating machine oil is successively supplied to the desiccator 3, the expansion mechanism 4, and the evaporator 5 to rapidly have a lower temperature (usually −40 to 0° C.) (points c and d in FIG. 1) and be returned back to the refrigerant compressor 1.

As the compressor 1, it is possible to use both open type compressors, which have a prime mover externally, and hermetic type compressors, which incorporate a motor internally.

Examples of the open type compressor include reciprocating types such as piston/crank types and piston/swash plate types, and rotating types such as rotating piston types, rotary vane types, scroll types, and screw types. Examples of the external prime movers include engines and motors, but particularly in the case of automobile air conditioners, it is common to use driving engines as external prime movers.

Examples of the hermetic type compressor include high-pressure container-type compressors housing a motor comprising a rotor and a stator in a sealed container storing a refrigerating machine oil composition, a rotation axis fitted in the rotor, and a compressor linked to the motor via the rotation axis, wherein high-pressure refrigerant gas released from the compressor is retained in the sealed container, and low-pressure container-type compressors housing a motor comprising a rotor and a stator in a sealed container storing a refrigerating machine oil composition, a rotation axis fitted in the rotor, and a compressor linked to the motor via the rotation axis, wherein high-pressure refrigerant gas released from the compressor is directly discharged out of the sealed container.

The desiccator 3 is packed with a desiccant such as synthetic zeolites comprising, for example, silicic acid and alkali aluminate metal complex salts.

In the refrigerant circulation system of the refrigerating machine 10, a member containing polyethylene terephthalate and/or a member containing hydrogenated acrylonitrile butadiene rubber are used in, for example, insulating portions inside the compressor 1 and sealing materials for preventing leakage of the refrigerant and the refrigerating machine oil composition in the compressor 1.

EXAMPLES

Hereinafter, the present invention will be described based on Examples and Comparative examples, but the present invention is not limited to the Examples.

In Examples 1 to 16, Comparative Examples 1 to 10, and Reference Examples 1 to 2, the following base oils and additives were used to prepare refrigerating machine oil compositions of which compositions are shown in Tables 1 to 5, and the following material compatibility test was conducted on each refrigerating machine oil composition obtained. The results are shown in Tables 1 to 5.

(Base Oil)

Base oil 1: an ester base oil in which (a1) an ester of pentaerythritol and a mixed acid of 2-methylpropanic acid/3,5,5-trimethylhexanoic acid (at a molar ratio of 1/1) and (31) an ester of neopentyl glycol and a mixed acid of 2-ethylhexanoic acid/3,5,5-trimethylhexanoic acid (at a molar ratio of 1/1) are mixed at a ratio of (a1) 50% by mass: (b1) 50% by mass.

Base oil 2: an ester base oil in which (a2) an ester of pentaerythritol and a mixed acid of 2-ethylhexanoic acid/3,5,5-trimethylhexanoic acid (at a molar ratio of 1/1) and (b2) an ester of dipentaerythritol and a mixed acid of 2-ethylhexanoic acid/3,5,5-trimethylhexanoic acid (at a molar ratio of 1/1) are mixed at a ratio of (a2) 75% by mass:(b2) 25% by mass.

Base oil 3: an ester base oil obtained by reacting 2-ethylhexanol (2.0 mol) with an ester intermediate of trimethylolpropane (1 mol) and adipic acid (2.4 mol) and distilling the remaining unreacted material off.

Base oil 4: an ester base oil of pentaerythritol and a mixed acid of n-pentanoic acid/n-heptanoic acid/3,5,5-trimethylhexanoic acid (at a molar ratio of 40/40/20).

(Additives)
(A) Epoxy Compounds
A1: glycidyl neodecanoate
A2: 2-ethylhexyl glycidyl ether
A3: 1,2-epoxytetradecane
A4: 3',4'-epoxycyclohexylmethyl-3,4-epoxycyclohexane carboxylate (CELLOXIDE 2021P)
(B) Carbodiimide Compounds
B1: bis(diisopropylphenyl)carbodiimide
B2: diisopropylcarbodiimide (Material Compatibility Test)

A sample of a strip made of hydrogenated acrylonitrile butadiene rubber (H-NBR) or polyethylene terephthalate (PET) placed in a mixture of 80 g of a refrigerating machine oil composition and 20 g of 2,3,3,3-tetrafluoropropene refrigerant (HFO-1234yf) of which moisture content was adjusted to 500 ppm was heated in a 200 ml autoclave at 150° C. for 200 hours. After heating was finished, the acid value of the refrigerating machine oil composition was measured, the tensile strength of the strips made of H-NBR or PET was measured, and the tensile strength change ratio (%) defined by the following formula was calculated.

Tensile strength change ratio [%]=(Tensile strength of the strip after the test/Tensile strength of the strip before the test)×100

The strips made of H-NBR and PET used in the test were each shaped into the following form.

H-NBR: length×width×thickness=5 cm×2 cm×0.2 cm

PET: length×width×thickness=5 cm×2 cm×300 μm

The acid value was measured in compliance with JIS K2501 "Petroleum products and lubricants—Determination of neutralization number", and the tensile strength was measured in compliance with JIS K6251.

TABLE 1

| | | | Example 1 | Example 2 | Example 3 | Example 4 | Example 5 | Example 6 |
|---|---|---|---|---|---|---|---|---|
| Composition (% by mass) | Base oil | Base oil 1 | Balance | Balance | Balance | Balance | Balance | Balance |
| | | Base oil 2 | — | — | — | — | — | — |
| | | Base oil 3 | — | — | — | — | — | — |
| | | Base oil 4 | — | — | — | — | — | — |
| | Additive | A1 | 4.5 | 2.0 | 0.5 | 0.1 | 0.1 | 0.1 |
| | | A2 | — | — | — | — | — | — |
| | | A3 | — | — | — | — | — | — |
| | | A4 | — | — | — | — | — | — |
| | | B1 | 0.01 | 0.1 | 0.1 | 3.0 | 1.0 | 0.1 |
| | | B2 | — | — | — | — | — | — |
| | Test refrigerant | | HFO-1234yf | HFO-1234yf | HFO-1234yf | HFO-1234yf | HFO-1234yf | HFO-1234yf |
| Material compatibility | H-NBR | Tensile strength change ratio (%) | 82 | 88 | 86 | 86 | 90 | 89 |
| | | Acid value (mgKOH/g) | 0.04 | 0.06 | 0.09 | 0.09 | 0.13 | 0.19 |
| | PET | Tensile strength change ratio (%) | 83 | 83 | 88 | 84 | 85 | 87 |
| | | Acid value (mgKOH/g) | 0.01 | 0.01 | 0.02 | 0.02 | 0.03 | 0.04 |

TABLE 2

| | | | Example 7 | Example 8 | Example 9 | Example 10 | Example 11 | Example 12 |
|---|---|---|---|---|---|---|---|---|
| Composition (% by mass) | Base oil | Base oil 1 | — | — | — | — | — | — |
| | | Base oil 2 | Balance | Balance | Balance | Balance | Balance | Balance |
| | | Base oil 3 | — | — | — | — | — | — |
| | | Base oil 4 | — | — | — | — | — | — |
| | Additive | A1 | — | — | — | — | — | — |
| | | A2 | 4.5 | 2.0 | 0.5 | 0.1 | 0.1 | 0.1 |
| | | A3 | — | — | — | — | — | — |
| | | A4 | — | — | — | — | — | — |
| | | B1 | 0.01 | 0.1 | 0.1 | 3.0 | 1.0 | 0.1 |
| | | B2 | — | — | — | — | — | — |
| | Test refrigerant | | HFO-1234yf | HFO-1234yf | HFO-1234yf | HFO-1234yf | HFO-1234yf | HFO-1234yf |
| Material compatibility | H-NBR | Tensile strength change ratio (%) | 82 | 87 | 85 | 85 | 89 | 89 |
| | | Acid value (mgKOH/g) | 0.05 | 0.07 | 0.09 | 0.09 | 0.12 | 0.18 |
| | PET | Tensile strength change ratio (%) | 81 | 85 | 88 | 83 | 85 | 86 |
| | | Acid value (mgKOH/g) | 0.01 | 0.01 | 0.03 | 0.03 | 0.05 | 0.06 |

TABLE 3

| | | | Example 13 | Example 14 | Example 15 | Example 16 |
|---|---|---|---|---|---|---|
| Composition (% by mass) | Base oil | Base oil 1 | — | — | — | — |
| | | Base oil 2 | — | — | — | — |
| | | Base oil 3 | Balance | Balance | — | — |
| | | Base oil 4 | — | — | Balance | Balance |
| | Additive | A1 | — | — | — | — |
| | | A2 | — | — | — | — |
| | | A3 | 4.5 | 0.1 | — | — |
| | | A4 | — | — | 4.5 | 0.1 |
| | | B1 | 0.01 | 1.0 | — | — |
| | | B2 | — | — | 0.01 | 1.0 |

TABLE 3-continued

|  |  |  | Example 13 | Example 14 | Example 15 | Example 16 |
|---|---|---|---|---|---|---|
|  | Test refrigerant |  | HFO-1234yf | HFO-1234yf | HFO-1234yf | HFO-1234yf |
| Material compatibility | H-NBR | Tensile strength change ratio (%) | 87 | 82 | 85 | 86 |
|  |  | Acid value (mgKOH/g) | 0.09 | 0.15 | 0.08 | 0.16 |
|  | PET | Tensile strength change ratio (%) | 83 | 83 | 85 | 83 |
|  |  | Acid value mgKOH/g | 0.03 | 0.07 | 0.05 | 0.09 |

TABLE 4

|  |  |  | Comp. Example 1 | Comp. Example 2 | Comp. Example 3 | Comp. Example 4 | Comp. Example 5 | Ref. Example 1 |
|---|---|---|---|---|---|---|---|---|
| Composition (% by mass) | Base oil | Base oil 1 | Balance | Balance | Balance | Balance | Balance | Balance |
|  |  | Base oil 2 | — | — | — | — | — | — |
|  |  | Base oil 3 | — | — | — | — | — | — |
|  |  | Base oil 4 | — | — | — | — | — | — |
|  | Additive | A1 | 5.0 | 2.0 | 0.5 | 0.1 | — | 0.1 |
|  |  | A2 | — | — | — | — | — | — |
|  |  | A3 | — | — | — | — | — | — |
|  |  | A4 | — | — | — | — | — | — |
|  |  | B1 | — | — | — | — | 0.1 | — |
|  |  | B2 | — | — | — | — | — | — |
|  | Test refrigerant |  | HFO-1234yf | HFO-1234yf | HFO-1234yf | HFO-1234yf | HFO-1234yf | R410A |
| Material compatibility | H-NBR | Tensile strength change ratio (%) | 72 | 87 | 83 | 87 | 92 | 86 |
|  |  | Acid value (mgKOH/g) | 0.05 | 0.29 | 0.48 | 1.32 | 0.77 | 0.17 |
|  | PET | Tensile strength change ratio (%) | 69 | 81 | 82 | 85 | 87 | 82 |
|  |  | Acid value (mgKOH/g) | 0.01 | 0.17 | 0.34 | 0.89 | 0.43 | 0.05 |

TABLE 5

|  |  |  | Comp. Example 6 | Comp. Example 7 | Comp. Example 8 | Comp. Example 9 | Comp. Example 10 | Ref. Example 2 |
|---|---|---|---|---|---|---|---|---|
| Composition (% by mass) | Base oil | Base oil 1 | — | — | — | — | — | — |
|  |  | Base oil 2 | Balance | Balance | Balance | Balance | Balance | Balance |
|  |  | Base oil 3 | — | — | — | — | — | — |
|  |  | Base oil 4 | — | — | — | — | — | — |
|  | Additive | A1 | — | — | — | — | — | — |
|  |  | A2 | 5.0 | 2.0 | 0.5 | 0.1 | — | 0.1 |
|  |  | A3 | — | — | — | — | — | — |
|  |  | A4 | — | — | — | — | — | — |
|  |  | B1 | — | — | — | — | 0.1 | — |
|  |  | B2 | — | — | — | — | — | — |
|  | Test refrigerant |  | HFO-1234yf | HFO-1234yf | HFO-1234yf | HFO-1234yf | HFO-1234yf | R410A |
| Material compatibility | H-NBR | Tensile strength change ratio (%) | 74 | 88 | 82 | 86 | 91 | 85 |
|  |  | Acid value (mgKOH/g) | 0.06 | 0.25 | 0.47 | 1.37 | 0.79 | 0.18 |

TABLE 5-continued

|  |  | Comp. Example 6 | Comp. Example 7 | Comp. Example 8 | Comp. Example 9 | Comp. Example 10 | Ref. Example 2 |
| --- | --- | --- | --- | --- | --- | --- | --- |
| PET | Tensile strength change ratio (%) | 70 | 82 | 85 | 89 | 86 | 85 |
|  | Acid value (mgKOH/g) | 0.01 | 0.15 | 0.35 | 0.88 | 0.45 | 0.06 |

Reference Signs List

1 . . . compressor, 2 . . . condenser, 3 . . . desiccator, 4 . . . expansion mechanism, 5 . . . evaporator, 6 . . . passage, 10 . . . refrigerating machine.

What is claimed is:

1. A refrigerating machine oil composition comprising:
an ester-based base oil;
at least 0.1% by mass, based on the total amount of the refrigerating machine oil composition, of an epoxy compound which is a glycidyl ether-type epoxy compound, glycidyl ester-type epoxy compound, oxirane compound, or alicyclic epoxy compound; and
at least 0.01% by mass, based on the total amount of the refrigerating machine oil composition, of a carbodiimide compound.

2. The refrigerating machine oil composition according to claim 1, wherein the ester-based base oil comprises an ester of pentaerythritol and a monocarboxylic fatty acid and/or an ester of dipentaerythritol and a monocarboxylic fatty acid.

3. The refrigerating machine oil composition according to claim 1, wherein the ester-based base oil comprises an ester of pentaerythritol and a mixture of two or more monocarboxylic fatty acids and/or an ester of dipentaerythritol and a mixture of two or more monocarboxylic fatty acids.

4. The refrigerating machine oil composition according to claim 3, wherein the epoxy compound is glycidyl neodecanoate or 2-ethylhexyl glycidyl ether, and the carbodiimide compound is bis(diisopropylphenyl)carbodiimide or diisopropylcarbodiimide, the content of the epoxy compound is 0.1% by mass or more and 4.5% by mass or less based on the total amount of the refrigerating machine oil composition, and the content of the carbodiimide compound is 0.01% by mass or more and 1% by mass or less based on the total amount of the refrigerating machine oil composition.

5. The refrigerating machine oil composition according to claim 1, wherein the epoxy compound is a glycidyl ether-type epoxy compound, or a glycidyl ester-type epoxy compound.

6. The refrigerating machine oil composition according to claim 5, wherein the glycidyl ether-type epoxy compound is represented by the following formula (2):

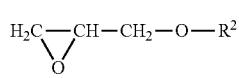

(2)

wherein R² represents an aryl group or an alkyl group having 5 to 18 carbon atoms.

7. The refrigerating machine oil composition according to claim 5, wherein the glycidyl ester-type epoxy compound is represented by the following formula (3):

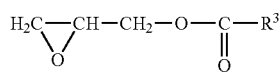

(3)

wherein R³ represents an aryl group, an alkyl group having 5 to 18 carbon atoms, or an alkenyl group.

8. The refrigerating machine oil composition according to claim 1, wherein the content of the epoxy compound is 0.1% by mass or more and 4.5% by mass or less based on the total amount of the refrigerating machine oil composition.

9. The refrigerating machine oil composition according to claim 1, wherein the carbodiimide compound is selected from the group consisting of dialkylcarbodiimides and bis(alkylphenyl)carbodiimides.

10. The refrigerating machine oil composition according to claim 1, wherein the content of the carbodiimide compound is 0.01% by mass or more and 1% by mass or less based on the total amount of the refrigerating machine oil composition.

11. A refrigerating machine comprising a refrigerant circulation system containing a compressor, a condenser, an expansion mechanism, and an evaporator,
the refrigerant circulation system comprising a member containing polyethylene terephthalate and/or a member containing hydrogenated acrylonitrile butadiene rubber, and
the refrigerant circulation system being filled with
a refrigerating machine oil composition comprising
an ester-based base oil,
at least 0.1% by mass, based on the total amount of the refrigerating machine oil composition, of an epoxy compound which is a glycidyl ether-type epoxy compound, glycidyl ester-type epoxy compound, oxirane compound, or alicyclic epoxy compound, and
at least 0.01% by mass, based on the total amount of the refrigerating machine oil composition, of a carbodiimide compound, and
a refrigerant containing a fluoropropene.

12. The refrigerating machine according to claim 11, wherein the epoxy compound is a glycidyl ether-type epoxy compound, or a glycidyl ester-type epoxy compound.

13. The refrigerating machine according to claim 12, wherein the glycidyl ether-type epoxy compound is represented by the following formula (2):

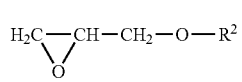

(2)

wherein R² represents an aryl group or an alkyl group having 5 to 18 carbon atoms.

14. The refrigerating machine according to claim 12, wherein the glycidyl ester-type epoxy compound is represented by the following formula (3):

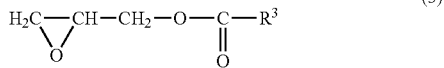

wherein $R^3$ represents an aryl group, an alkyl group having 5 to 18 carbon atoms, or an alkenyl group.

15. The refrigerating machine according to claim 11, wherein the content of the epoxy compound is 0.1% by mass or more and 4.5% by mass or less based on the total amount of the refrigerating machine oil composition.

16. The refrigerating machine according to claim 11, wherein the carbodiimide compound is selected from the group consisting of dialkylcarbodiimides and bis(alkylphenyl)carbodiimides.

17. The refrigerating machine according to claim 11, wherein the content of the carbodiimide compound is 0.01% by mass or more and 1% by mass or less based on the total amount of the refrigerating machine oil composition.

18. The refrigerating machine according to claim 11, wherein the refrigerant circulation system comprises the member containing hydrogenated acrylonitrile butadiene rubber.

19. The refrigerating machine according to claim 11, wherein the refrigerant circulation system comprising the member containing polyethylene terephthalate and the member containing hydrogenated acrylonitrile butadiene rubber.

20. The refrigerating machine according to claim 11, wherein the ester-based base oil comprises an ester of pentaerythritol and a mixture of two or more monocarboxylic fatty acids and/or an ester of dipentaerythritol and a mixture of two or more monocarboxylic fatty acids, the epoxy compound is glycidyl neodecanoate or 2-ethylhexyl glycidyl ether, and the carbodiimide compound is bis(diisopropylphenyl)carbodiimide or diisopropylcarbodiimide, the content of the epoxy compound is 0.1% by mass or more and 4.5% by mass or less based on the total amount of the refrigerating machine oil composition, and the content of the carbodiimide compound is 0.01% by mass or more and 1% by mass or less based on the total amount of the refrigerating machine oil composition.

* * * * *